United States Patent [19]
Strauff

[11] 3,922,953
[45] Dec. 2, 1975

[54] SYSTEM FOR LIMITING THE FORCE OF REACTION IN HYDRAULIC SERVO-CONTROL DEVICES

[75] Inventor: Gunther Strauff, Kaarst, Germany

[73] Assignee: Langen & Co., Duesseldorf, Germany

[22] Filed: Nov. 12, 1973

[21] Appl. No.: 415,168

[30] Foreign Application Priority Data
Nov. 16, 1972 Germany.............................. 2256072

[52] U.S. Cl. ...................... 91/371; 91/434; 91/465; 137/112
[51] Int. Cl.² ............................................ F15B 9/10
[58] Field of Search ............. 91/462, 465, 433, 434, 91/371; 137/112

[56] References Cited
UNITED STATES PATENTS

| | | | |
|---|---|---|---|
| 2,063,937 | 12/1936 | Kundig............................... | 91/434 X |
| 2,395,811 | 3/1946 | Griffith.............................. | 91/434 X |
| 2,468,960 | 5/1949 | Case .................................. | 91/434 X |
| 2,554,843 | 5/1951 | Staude............................... | 91/434 X |
| 2,707,375 | 5/1955 | Hammond ........................ | 91/434 X |
| 3,444,785 | 5/1969 | Katz et al......................... | 91/434 |
| 3,473,443 | 10/1969 | Mikkelsen......................... | 91/437 |
| 3,605,562 | 9/1971 | Larsen .............................. | 91/433 |
| 3,693,747 | 9/1972 | Nishikawa........................ | 137/115 X |
| 3,719,124 | 3/1973 | Katz et al......................... | 91/434 |
| 3,800,670 | 4/1974 | Hufeld et al..................... | 137/115 X |

FOREIGN PATENTS OR APPLICATIONS

| | | | |
|---|---|---|---|
| 868,636 | 5/1961 | United Kingdom................ | 137/112 |
| 1,257,410 | 2/1961 | France................................. | 91/465 |
| 1,221,654 | 2/1971 | United Kingdom................ | 91/465 |

Primary Examiner—Martin P. Schwadron
Assistant Examiner—Abraham Hershkovitz
Attorney, Agent, or Firm—Holman & Stern

[57] ABSTRACT

A system for limiting the force of reaction in hydraulic servo-control devices in which there is provided an actuating member as well as a power output member, with the power output member being relatively movable in relation to the actuating member and communicating with a servo-motor provided with working or operating spaces in which the relative movement which results between the actuating member and the power output member is effected for activating a valve mechanism which connects the working or operating spaces interchangably with a pressure source or a drain in the sense of amplifying means. Reaction members are provided for reacting upon the actuating member and the reaction members are stressed in the reaction chamber by the pressures of the working spaces or their proportional pressures up to a predetermined value, and are then subjected, by a pressure-limitation, of a pressure only which is of a substantially constant value.

2 Claims, 3 Drawing Figures

SYSTEM FOR LIMITING THE FORCE OF REACTION IN HYDRAULIC SERVO-CONTROL DEVICES

BACKGROUND OF THE INVENTION

This invention relates to an arrangement for limiting the force of reaction in hydraulic servo control devices including an actuating member as well as a power output member which is relatively movable in relation to the actuating member, and is in operational communication with a servo-motor provided with operating or working spaces whereby the relative movement which is utilized for activating a valve mechanism which connects the operational areas in the sense of amplification interchangeably with a pressure source or a drain and in which reaction members are provided which have a return effect on the actuating member, with the reaction members being stressed in the reaction chambers by the pressures of the operating space, or the proportional pressures, up to a limited value, then, sensing only a pressure of a generally constant value through pressure-limitation.

At the outset, it should be pointed out that the term "servo-motor" includes not only simple piston/cylinder systems but also a plurality of parallel-switch piston/cylinder systems. Logically, this covers multi-functional cylinders as well as oppositely-switched, simple-functioning cylinders. In addition to servo-motors with a translatory power take-off, it also applies to equally-suitable motors with a rotary power take-off. In a similar manner, the term "valve mechanism" comprehends control valves with one or two control pistons. The reaction members can be installed completely separate from the control piston but of a unitary structure whereby the control piston obtains one or two reaction areas.

PRIOR ART

Systems of the above-mentioned type are known and in which each pressure-limiting valve is coupled to two reaction chambers whereby the pressure in the reaction chambers is limited to a predetermined value. Such a system, however, has associated therewith the requirement that both pressure-limiting valves be precisely coordinated with each other so as to realize a symmetrical steering behavior. Since after an extended period of operation, wear of the guiding or control edge and the setting of the springs etc. may change the original condition, a regular servicing of such systems is necessary. Even though a proposal was made for employing spherical valves, it is generally known that spherical valves markedly are unable to be throttled and hence tend to develop noise and reaction variations.

SUMMARY OF THE INVENTION

It is the object of the present invention to overcome the disadvantages mentioned, namely, to provide a system of the above-discussed type in which a symmetrical steering response is retained over a longer period of time and whereby maintenance costs are reduced as well as unpleasant noise and reaction variations being eliminated.

The problem has been solved by the present invention in that each reaction chamber is connected with the corresponding working spaces via a throttle or restriction and with a single pressure-limiting valve via a one-way valve which opens in the direction of the pressure-limiting valve. Advantageously, the outflow to the one-way valve is from the highest point of the reaction chambers. This provides for the possibility of communication with the pressure-limiting valve by turning the steering wheel up to the boss limitation and to use this effect, for example, after the installation for evacuating the reaction chamber. The pressure-limiting valve may be a slide-valve or a seat-valve. It should, however, always be provided with a throttle. If an adjustment of the restoring force (resiliency) is proposed, various maximum reaction forces can be obtained. The throttle can be of various types. It is recommended to use these throttles having a self-cleaning effect since they are less subject to clogging or otherwise fouling.

Further advantages of the invention will become more readily apparent from the following detailed description and annexed drawings and in which drawings:

DESCRIPTION OF PREFERRED EMBODIMENTS

Figure 1:
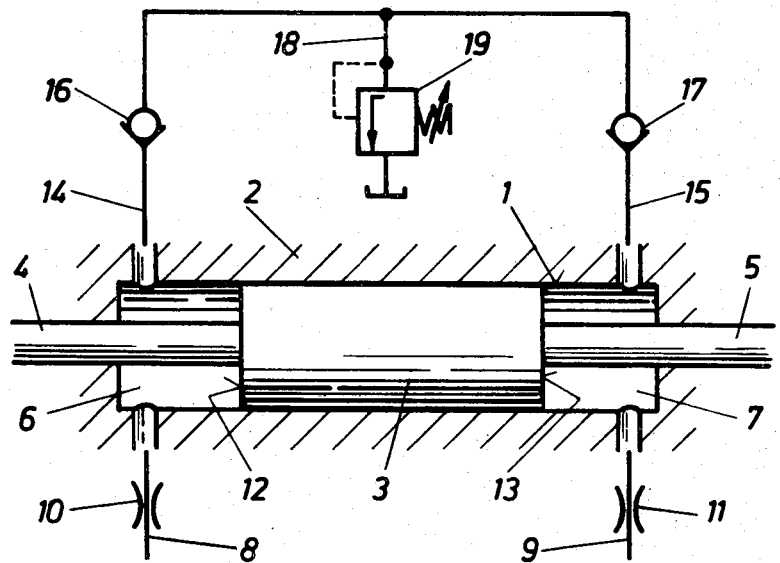
FIG. 1 is a diagrammatic view of the switching for a reaction member provided with two counter-effective reaction areas.

As illustrated in FIG. 1, a housing 2 is provided with a bore or cylinder 1 in which slides a piston 3, with the piston serving as a reaction member. The piston 3 is provided at its end faces with piston rods 4 and 5 which are guided outwardly through the housing 2 in a fluid-tight manner. One of the piston rods 4 or 5 affects a section of a steering spindle (not shown) whereby the steering spindle is connected with a steering wheel. The housing 2 is connected with another section which, for example, affects the steerable wheels by means of a steering mechanism or similar device. Annular spaces or chambers 6 and 7 provided between the piston rods 4 and 5 and the housing 2 serve as reaction chambers. Pipes or lines 8 and 9 are connected to the annular spaces 6 and 7, respectively, with throttles or restrictions 10 and 11 being provided for such pipes. The pipes 8 and 9 are in communication with the working or operating chambers of a servo-motor in a manner not illustrated in detail, which, in a sense of an amplifying means, affects that section of the power-transmission device which faces away from the steering wheel. The stress on the operating chambers of the servo-motor is effected by means of a control valve (not shown in detail). The respective pressure in the operating chambers which is conveyed via pipes 8 and 9 into the annular spaces 6 and 7 affects therein annular surfaces 12 and 13 of the piston 3 and which annular surfaces serve as reaction areas. Additional pipes or lines 14 and 15 are respectively connected to the annular spaces 6 and 7 with one-way valves 16, and 17, being mounted in the pipes 14 and 15, respectively, and which one-way valves 16 and 17 open in a direction away from the annular spaces 6 and 7. The pipes 14 and 15 merge into a pipe or line 18 in which is mounted a pressure-limiting valve 19. It will be clearly seen that the pressure in the annular spaces 6 and 7 is able to increase only up to the value which is predetermined by the pressure-limiting valve 19. If this value is exceeded, the pressure-limiting valve 19 opens and pressure flows back into a pressure reservoir R. The pressures which affect the surfaces 12 and 13 and thereby the reaction force on the piston 3, are thus unable to increase any further. An overflow from the annular space 6 into the annular space 7 or vise-versa is prevented by the counter-switching of the one-way valves 16 and 17.

Figure 2:
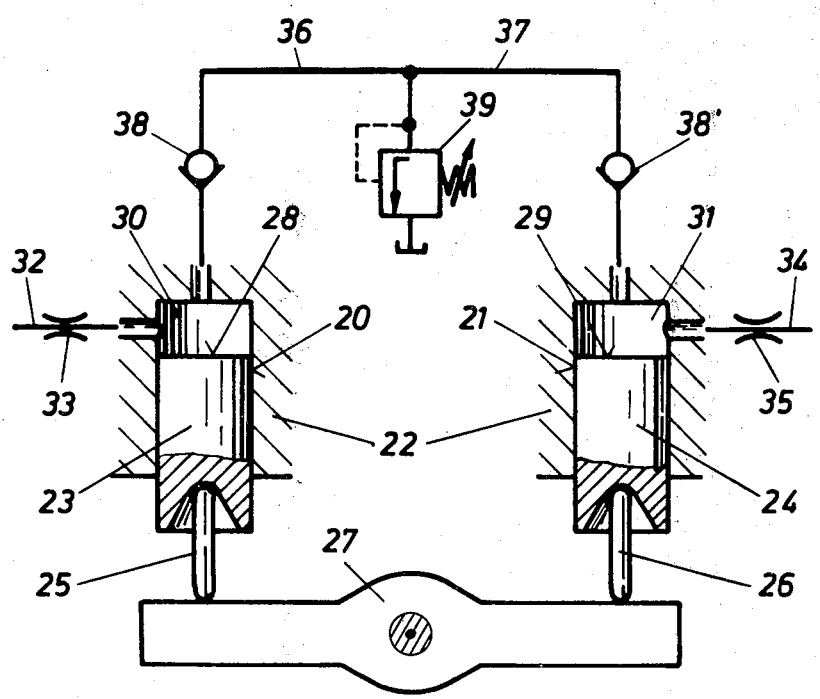
FIG. 2 is a similar view for two separately-arranged reaction members.

FIG. 2 illustrates an embodiment of the present invention in which pistons 23 and 24, which serve as reaction members, are arranged in bores or cylinders 20 and 21 of a housing 22. The pistons 23 and 24 may be moved by an intermediately pivoted lever 27 via push rods 25 and 26 so that the lever 27 functions as an actuating member. Frontal surfaces 28 and 29 of the pistons 23 and 24, which function as reaction areas, limit reaction chambers 30 and 31, respectively. A pipe or line 32 is connected to the reaction chamber 30 and has a throttle or restriction 33 installed therein. In a similar manner, a pipe or line 34 is connected to the reaction chamber 31 and a throttle or restriction 35 is installed in the pipe 34. The pipes 32 and 34 are in communication with the respective working or operating spaces of a servo-motor (not shown). Additional pipes 36 and 37 are connected to the reaction chambers 30 and 31 with check-valves 38 and 39 being installed in the pipes 36 and 37 and the check-valves open in a direction away from the reaction chambers 30 and 31. The pipes 36 and 37 merge into a pipe in which is located a pressure-limiting valve 39. The function thereof is identical to that described in connection with FIG. 1.

The valve 39 limits the pressures in the reaction chambers 30 and 31 to a predetermined value. The reaction force which affects the actuating member 27 is thus also limited. The throttles 33 and 35 function to prevent an excessive fluid consumption via the pressure-limiting valve 39. This, in other words, means that the throttles 33 and 35 permit a pressure reduction between the working areas and the reaction chambers 30 and 31 after engaging the pressure-limiting valve 39. The pressure in a working space can then increase further while the pressure in the reaction chamber is limited.

Figure 3:
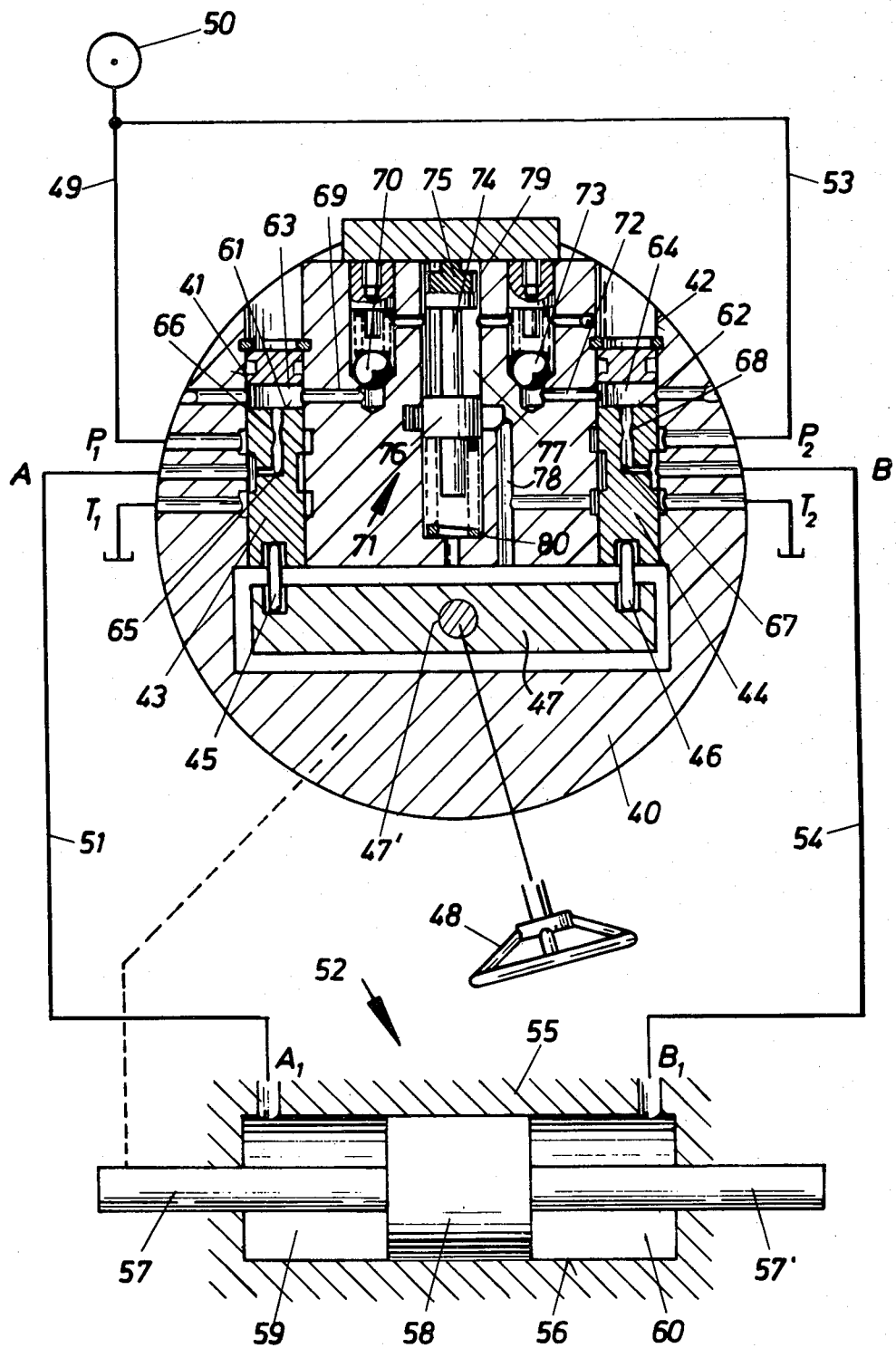
FIG. 3 is a view partly in elevation and partly in cross-section in accordance with the embodiment illustrated in FIG. 2 and in which the reaction members simultaneously function as control pistons.

Referring now to FIG. 3 which illustrates in detail an embodiment of the system according to FIG. 2, it should be noted that the reaction members function simultaneously as control pistons. Two parallel bores or cylinders 41 and 42 are arranged in a valve member 40 transversely and eccentrically to the axis of the valve member. Control pistons 43 and 44 are slidably arranged in the bores 41 and 42. The actuation of the control pistons 43 and 44 is effected via push rods 45 and 46 by an intermediately pivoted lever 47 and which lever functions as an actuating member. The lever 47 is operably connected with a steering wheel 48 through a shaft 47' (not shown in detail). The control piston 43 connects interchangeably a connection A with a connection $P_1$ or a drain $T_1$. The connection $P_1$ is connected with a pressure-source 50 by means of a pressure pipe or line 49. A pipe or line 51 leads from the connection A to a connection $A_1$ of a servo-motor denoted generally 52. The drain $T_1$ is connected with a reservoir. The control piston 44 interchangeably connects a connection B with a connection $P_2$ or a drain $T_2$. The connection $P_2$ is connected with the pressure source 50 via a pressure pipe or line 53. The connection B is in communication with a connection $B_1$ of the servo-motor 52 via a pipe or line 54. The drain $T_2$ is connected with a reservoir. The servo-motor 52 is provided with a housing 55 having a bore or cylinder 56 therein, and a piston 58 having piston rods 57 and 57' extending from opposite faces thereof is arranged to slide in the bore 56. The annular spaces which are provided between the piston rods 57 and 57' and the housing 55 define the working chambers 59 and 60. In a manner not illustrated in detail, there is present an effective connection between the valve member 40 and one of the piston rods 57 or 58. It must be considered at this point that the connections shown in the valve member 40 are, in practice, in many instances not present in the valve 40 per se but in a connecting member which is not illustrated in detail and with which the valve member cooperates in a manner of a torsional distributor. The connecting member, in most cases, is stationarily mounted while the valve member 40 is rotatable. The front areas of the control pistons 43 and 44 function as reaction areas 61 and 62 to limit the reaction chambers 63 and 64. The reaction chamber 63 is connected with the connection A by a bore 65 provided in the control piston 43. A throttle or restriction 66 is provided for the bore 65. A bore 67 inside the control piston 44 connects the connection B with the reaction chamber 64 and a throttle or restriction 68 is provided for the bore 67.

A bore 69 connects the reaction chamber 63 with a one-way valve 70. The fluid moves from the valve 70 to a pressure-limiting valve 71. From the reaction chamber 64, the fluid reaches the pressure-limiting valve 71 via a bore 72 and a one-way valve 73. The pressure-limiting valve 71 is provided with a control piston having two shoulders or lands 75 and 76 which are separated by connecting bar 74. In an inoperative position, the shoulder 76 blocks an annular space 77 which surrounds the connecting bar 74 from an outflow channel 78 connected to drain T2. The actuation of the pressure-limiting valve is effected by means of fluid which flows from the annular space 77 to the front-side of the shoulder 75 via throttle means 79 on the shoulder 75. When exceeding a predetermined pressure value, the control piston is then lifted against the force of a spring 80 which affects the shoulder 76. The shoulder 76 releases thereby a connection between the annular space 77 and the outflow channel 78 to drain T2.

It is to be understood that the present invention is not limited to the embodiments illustrated herein. Particularly, various possibilities are open in the construction of the pressure-limiting valve. It is possible, for example, to utilize a seat-valve. However, it should be considered that such type of a seat-valve is throttled. The means 79 which serves for the throttling may, for the same function, be replaced by a nozzle threaded therein or by an annular slot. Small bores may also be utilized. Similarly thereto, the throttle point points 66 and 68 may be realized in a different fashion.

I claim:

1. A system for limiting the force of reaction in hydraulic servo-control devices, comprising in combination an actuating member, a servo-motor provided with working chambers defined by movable members including a piston and a cylinder, a power output member movable relative to the actuating member and connected to one of the movable members of the servo-motor, a valve mechanism connecting the working chambers of the servo-motor interchangeably with a fluid pressure source and a drain, means for actuating said valve mechanism upon relative movement between the actuating member and the power output member drain and reaction members operatively connected to the actuating member for reacting upon the actuating member and defining reaction chambers, the reaction members being subject to pressure developed in the reaction chambers, each reaction chamber being connected with a respective working chamber, the pressure in the reaction chambers being limited to a predetermined value, whereby said reaction members are subjected to a pressure-limitation of a substantially constant value, the improvement comprising means connecting each reaction chamber with a respective working chamber via throttle means and a single pressure-limiting valve means connected to each reaction chamber via one-way valve means.

2. The system as claimed in claim 1 in which said one-way valve means comprise ball valves.

* * * * *